US010605138B2

(12) United States Patent
Muntean et al.

(10) Patent No.: US 10,605,138 B2
(45) Date of Patent: Mar. 31, 2020

(54) AIR CURTAIN FOR UREA MIXING CHAMBER

(71) Applicant: CUMMINS EMISSION SOLUTIONS, INC., Columbus, IN (US)

(72) Inventors: George L. Muntean, Columbus, IN (US); Steve Holl, Columbus, IN (US); Joydeep Chakrabarti, Indianapolis, IN (US); John Anthis, Columbus, IN (US); Joshua D. Henry, Indianapolis, IN (US); Samuel Johnson, Bloomington, IN (US); Andrew Myer, Greenwood, IN (US); John K. Heichelbech, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 69 days.

(21) Appl. No.: 15/895,809

(22) Filed: Feb. 13, 2018

(65) Prior Publication Data

US 2018/0171851 A1   Jun. 21, 2018

Related U.S. Application Data

(62) Division of application No. 13/969,039, filed on Aug. 16, 2013, now Pat. No. 9,926,822.

(51) Int. Cl.
*F01N 3/00* (2006.01)
*F01N 3/20* (2006.01)
(Continued)

(52) U.S. Cl.
CPC ........ *F01N 3/2066* (2013.01); *B01F 3/04049* (2013.01); *B01F 5/045* (2013.01);
(Continued)

(58) Field of Classification Search
CPC .............. F01N 3/2066; F01N 2610/02; F01N 2610/14; F01N 2610/146;
(Continued)

(56) References Cited

U.S. PATENT DOCUMENTS

| 2,234,387 A | 3/1941 | Schott |
| 2,805,966 A | 9/1957 | Etheridge |

(Continued)

FOREIGN PATENT DOCUMENTS

| WO | WO-2004/046513 | 6/2004 |
| WO | WO-2008/135332 | 11/2008 |

(Continued)

OTHER PUBLICATIONS

International Search Report and Written Opinion for PCT Applciation No. PCT/US2014/45948, dated Oct. 27, 2014, 9 pages.

*Primary Examiner* — Anshu Bhatia
(74) *Attorney, Agent, or Firm* — Foley & Lardner LLP

(57) ABSTRACT

An exemplary embodiment includes a blending chamber having a urea inlet, a blending chamber gas inlet, and a blending chamber outlet. A urea source provides a pressurized urea solution to the urea inlet at a urea injection pressure, and a pressurized gas source transmits pressurized gas to the blending chamber gas inlet via a passageway. The passageway is configured to decrease pressure of the pressurized gas transmitted along its length from a first pressure of gas received from the pressurized gas source to a second pressure of gas provided to the blending chamber gas inlet. The first pressure of gas received from the pressurized gas source is greater than the urea injection pressure and the second pressure of gas provided to the blending chamber gas inlet is less than the urea injection pressure.

9 Claims, 5 Drawing Sheets

(51) Int. Cl.
  *B01F 5/04*    (2006.01)
  *B01F 3/04*    (2006.01)
  *B01F 5/00*    (2006.01)

(52) U.S. Cl.
  CPC ... *B01F 2005/0017* (2013.01); *F01N 2610/02* (2013.01); *F01N 2610/14* (2013.01); *F01N 2610/146* (2013.01); *F01N 2610/1493* (2013.01); *Y02T 10/24* (2013.01)

(58) Field of Classification Search
  CPC .......... F01N 2610/1493; B01F 3/04049; B01F 5/045; B01F 2005/0017; Y02T 10/24
  See application file for complete search history.

(56) References Cited

U.S. PATENT DOCUMENTS

| | | | |
|---|---|---|---|
| 4,103,827 A | 8/1978 | Kumazawa | |
| 5,322,222 A | 6/1994 | Lott | |
| 5,605,042 A * | 2/1997 | Stutzenberger | B01D 53/9431 60/286 |
| 5,943,858 A | 8/1999 | Hofmann et al. | |
| 6,157,774 A | 12/2000 | Komino et al. | |
| 6,167,698 B1 | 1/2001 | King et al. | |
| 6,266,955 B1 | 7/2001 | Liang et al. | |
| 6,293,097 B1 | 9/2001 | Wu et al. | |
| 6,878,359 B1 | 4/2005 | Mathes et al. | |
| 7,337,607 B2 * | 3/2008 | Hou | F01N 3/0253 60/274 |
| 7,458,204 B2 | 12/2008 | Plougmann | |
| 7,685,810 B2 | 3/2010 | Hirata et al. | |
| 8,201,393 B2 | 6/2012 | Zapf et al. | |
| 8,240,137 B2 | 8/2012 | Liu et al. | |
| 8,282,901 B2 * | 10/2012 | Petrocelli | B01D 53/002 423/235 |
| 8,888,017 B2 | 11/2014 | Ponnathpur et al. | |
| 9,162,198 B2 * | 10/2015 | Martinelle | F01N 3/2066 |
| 9,255,512 B2 | 2/2016 | Huang et al. | |
| 9,315,391 B2 * | 4/2016 | Gerhart | C01C 1/04 |
| 9,371,240 B2 * | 6/2016 | Gerhart | C01C 1/08 |
| 9,731,976 B2 * | 8/2017 | Gerhart | C01C 1/04 |
| 2003/0145580 A1 | 8/2003 | Ripper et al. | |
| 2006/0101810 A1 * | 5/2006 | Angelo | F01N 3/0253 60/286 |
| 2007/0186543 A1 | 8/2007 | Bakaj et al. | |
| 2009/0031714 A1 | 2/2009 | Jochumsen et al. | |
| 2010/0180576 A1 | 7/2010 | Wang et al. | |
| 2010/0319322 A1 | 12/2010 | Huthwohl | |
| 2011/0131959 A1 | 6/2011 | Zhang | |
| 2011/0139132 A1 | 6/2011 | Smith et al. | |
| 2011/0271660 A1 | 11/2011 | Gonze et al. | |
| 2012/0042631 A1 | 2/2012 | Schmieg et al. | |
| 2012/0087840 A1 * | 4/2012 | Hirschberg | B01D 53/90 422/177 |
| 2012/0160934 A1 | 6/2012 | Ponnathpur et al. | |
| 2012/0222401 A1 | 9/2012 | Scherer et al. | |
| 2014/0127100 A1 * | 5/2014 | Gerhart | C01C 1/08 423/212 |
| 2014/0223892 A1 * | 8/2014 | Martinelle | F01N 3/2066 60/301 |

FOREIGN PATENT DOCUMENTS

| | | |
|---|---|---|
| WO | WO-2013/028729 | 2/2013 |
| WO | WO-2013/028741 | 2/2013 |

* cited by examiner

AIR CURTAIN FOR UREA MIXING CHAMBER

CROSS-REFERENCE TO RELATED APPLICATIONS

This application is a divisional of U.S. patent application Ser. No. 13/969,039, filed Aug. 16, 2013, the contents of which are incorporated herein by reference in their entirety.

BACKGROUND

Selective catalytic reduction ("SCR") exhaust aftertreatment systems are an important technology for reducing $NO_x$ emissions from internal combustion engines such as diesel engines. SCR systems generally include a source of urea solution, a pump unit for pressurizing the urea solution, a metering unit for providing a controlled amount or rate of urea solution, and an injector which provides urea solution to an exhaust flowpath including an SCR catalyst. Many SCR systems also utilize pressurized gas to assist the flow of urea solution to the injector. While providing important reductions in $NO_x$ emissions, SCR systems suffer from a number of shortcomings and problems. Use of urea solutions in SCR systems may result in growth of urea crystals or deposits on various components of the system, which may disrupt their operation. When the urea comes into contact with a hot injector nozzle, the urea may undergo resulting in pressure waves forcing urea backward through the blending chamber and into the pressurized air supply passage. This may result in urea crystals forming within the pressurized air supply passage, which may obstruct the air supply passage, and may corrode or otherwise degrade the walls of the air supply passage. Additionally, if an injector nozzle becomes blocked, either permanently or intermittently, there is a risk that injected urea may flow into the pressurized air supply passage which may result in urea crystal formation within the pressurized air supply passage. There is a long felt need for advancements mitigating these and other shortcomings associated with SCR systems utilizing urea solution.

DISCLOSURE

For the purposes of promoting an understanding of the principles of the invention, reference will now be made to the embodiments illustrated in the drawings and specific language will be used to describe the same. It will be understood that no limitation of the scope of the invention is thereby intended. Any alterations and further modifications in the illustrated embodiments, and any further applications of the principles of the invention as illustrated therein as would normally occur to one skilled in the art to which the invention relates, are contemplated herein.

SUMMARY

An illustrative embodiment includes a blending char having a urea inlet, a blending chamber gas inlet, and a blending chamber outlet. A urea source provides a pressurized urea solution to the urea inlet at a urea injection pressure, and a pressurized gas source transmits pressurized gas to the blending chamber gas inlet via a passageway. The passageway is configured to decrease pressure of the pressurized gas transmitted along its length from a first pressure of gas received from the pressurized gas source to a second pressure of gas provided to the blending chamber gas inlet. The first pressure of gas received from the pressurized gas source is greater than the urea injection pressure, and the second pressure of gas provided to the blending chamber gas inlet is less than the urea injection pressure.

DETAILED DESCRIPTION

Figure 1:
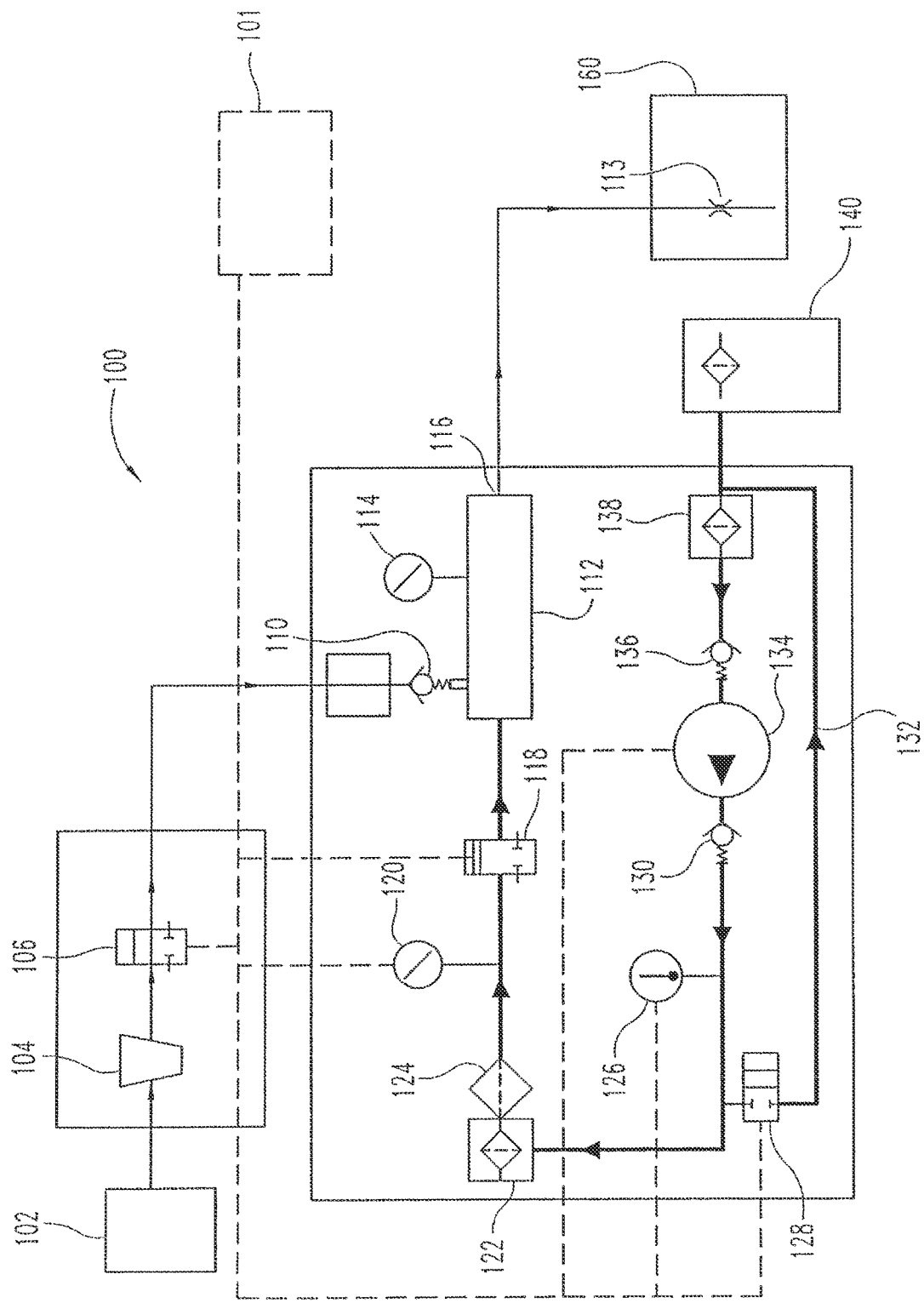
FIG. 1 is a schematic view of an exemplary air-assisted urea injection system.

With reference to FIG. 1 there is illustrated an exemplary system 100 for injection of urea solution into an SCR exhaust aftertreatment system. System 100 may be provided on a vehicle powered by an engine such as a diesel engine, or on an engine utilized in other applications such power generation or pumping systems. System 100 includes a pump 134 which draws urea solution from tank 140 through filter screen 138 and check valve 136. A preferred urea solution is diesel exhaust fluid (DEF) which comprises a solution of 32.5% high purity urea and 67.5% deionized water. It shall be appreciated, however, that other urea solutions may also be utilized. In a preferred form pump 134 is a diaphragm pump, though it shall be appreciated that other types of pumps may be utilized. Pump 134 is controlled to output pressurized urea solution at a predetermined pressure which flows through check valve 130, pulsation dampener 122, and filter 124 to provide pressurized urea solution to metering valve 118. System 100 may further include a bypass valve 128 which is operable to open and close to permit or prevent the flow of urea solution through bypass line 132 to a location downstream of screen 138 where it may be returned to the tank 140, for example during a purging operation.

Metering valve 118 is operable to provide urea solution to blending device 112 at a controllable rate. In certain embodiments, blending device 112 may include metering valve 118. Blending device 112 also receives a flow of pressurized air from an air supply 102 and discharges a combined flow of pressurized air and urea solution at outlet 116. Air supply 102 may be integral to a vehicle, integral to an engine, or may be an air supply dedicated to system 100. It shall be understood that additional embodiments may utilize pressurized gases other than air, for example, combinations of one or more inert gases. Air supply 102 provides pressurized air to air regulator 104. From air regulator 104 pressurized air proceeds to air shutoff valve 106 which can be selectively opened to allow pressurized air to flow to check valve 110 and closed to obstruct the flow of pressurized air. Check valve 110 opens when the air pressure at its inlet is above a threshold pressure and closes when the air pressure is below the threshold. From check valve 110 pressurized air flows to blending device 112. A combined flow of aqueous urea solution entrained in pressurized air exits blending device outlet 116 and is provided to nozzle 113 which is configured to inject the combined flow into an exhaust aftertreatment system 160 such as a urea decomposition tube or exhaust flow passage leading to an SCR catalyst. In the illustrated embodiment, outlet 116 is fluidly coupled to a single nozzle 113 via a fluid line. It is also contemplated that nozzle 113 may be coupled directly to outlet 116, and that outlet 116 may be fluidly coupled to a plurality of nozzles, for example via a plurality of fluid lines.

System 100 may be controlled and monitored by a controller 101 such as an engine control module (ECM) or a doser control module (DCM). It shall be appreciated that the controller or control module may be provided in a variety of forms and configurations including one or more computing devices having non-transitory memory storing computer executable instructions, processing, and communication hardware. It shall be further appreciated that the controller may be a single device or a distributed device, and the functions of the controller may be performed by hardware or software.

Controller 101 is operatively coupled with and configured to store instructions in a memory which are readable and executable by controller 101 to control diaphragm pump 134, air shut off valve 106, metering valve 118, and bypass valve 128. Controller 101 is also operatively coupled to and may receive a signal from a pressure sensor 114, pressure sensor 120 and temperature sensor 126. Pressure sensor 114 is operable to provide a signal indicating the pressure in blending device 112 at a location downstream from the urea inlet and the pressurized air inlet. The pressure at this location may be pressure of a combined flow of pressurized air and urea, pressure of air alone, pressure of urea alone, or pressure in the absence of urea compressed air depending on the operational state of metering valve 118 and air shut off valve 106. Temperature sensor 126 is operable to provide a signal to controller 101 indicating the temperature of urea solution at a location between diaphragm pump 134 and metering valve 118. Pressure sensor 120 is operable to provide a signal to controller 101 indicating the pressure of the urea solution upstream from of metering valve 118.

Figure 2:
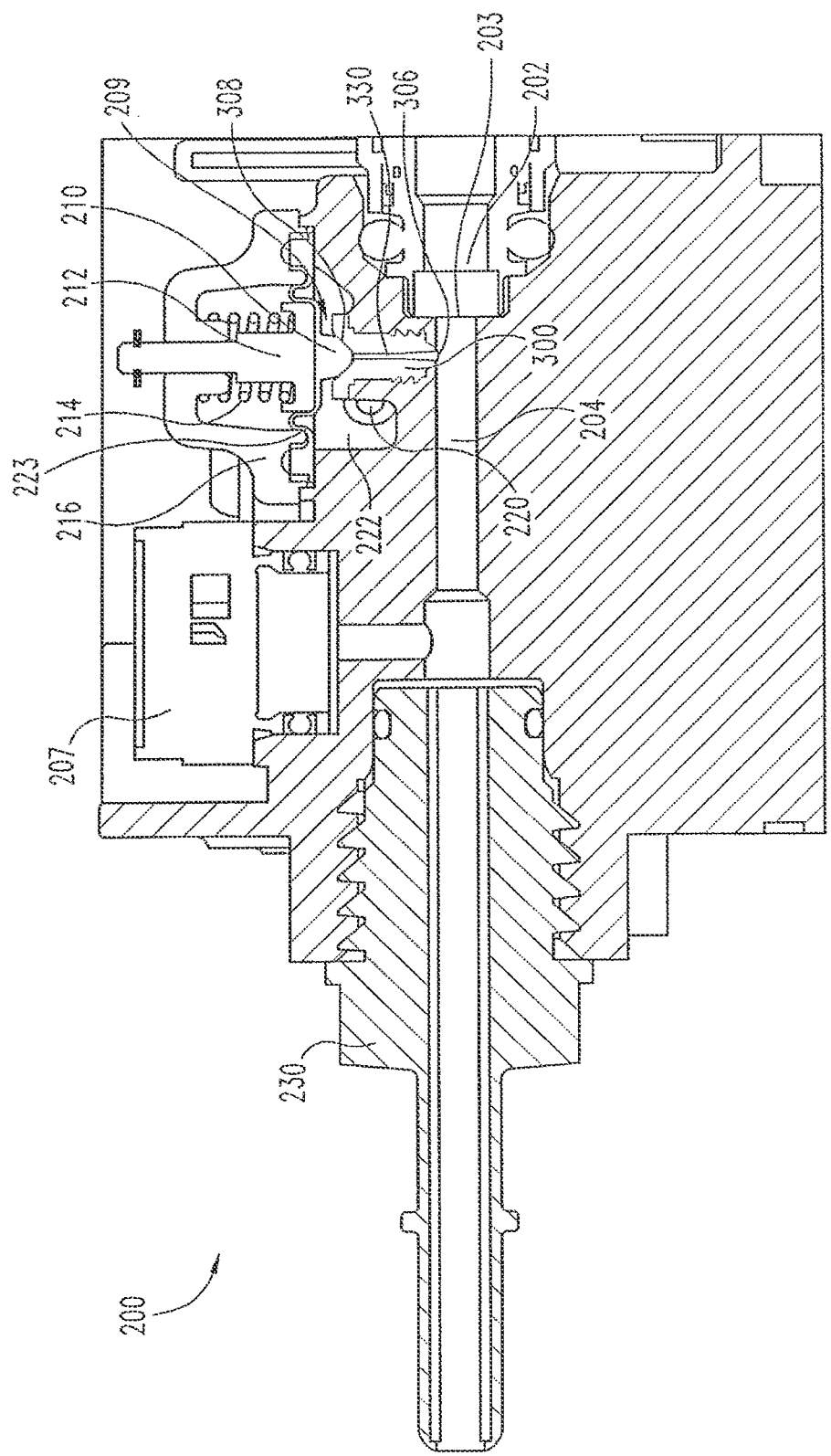
FIG. 2 is a sectional view of an exemplary blending device.

With reference to FIG. 2, there is illustrated an exemplary blending device 200 which is operable to output a combined flow of urea solution and pressurized air. Blending device 200 includes a metering valve 202 having an outlet 203 which provides urea solution at a urea supply pressure to a blending chamber 204. Metering valve 202 can be controlled by controller 101 to provide urea solution at a controlled rate in a controlled amount. Blending chamber 204 also receives a flow of pressurized air from flow passage 330, which extends from an outlet 306 to a seating surface 308. Flow passage 330, outlet 306, and seating surface 308 are each defined by a nozzle 300. Nozzle 300 is installed in a cavity which is formed in a wall of blending device 200 between air supply chamber 222 and blending chamber 204. It shall be appreciated that the illustrated blending device 200 is but one example and that a variety of alternate blending devices including different configurations, geometries and components may also be utilized in additional embodiments.

The flow passage may 330 may be provided in a number of different configurations. In the embodiment illustrated in FIG. 2, a set of threads defined by an outer surface of nozzle 300 matingly engage a corresponding set of threads defined by a surface of the cavity. It is also contemplated that nozzle 300 may be coupled to blending device 200 by other methods, or that passage 330 may be defined by the wall through which it extends without use of an insert. The flow of pressurized air through flow passage 330 is controlled to have a velocity and flow characteristics effective to provide an air curtain which resists formation and migration of urea crystals and accommodates elevated pressure conditions which would otherwise inhibit injection of urea solution into blending chamber 104.

In the illustrated form, blending chamber 204 is a substantially cylindrical passage which is configured so that urea received from metering valve 202 is entrained in a flow of pressurized air received from flow passage 330, and a combined flow of pressurized air and urea solution is provided to outlet member 230 which is connected to an injector configured to provide the combined flow to an exhaust aftertreatment system. Pressure sensor 207 is operable to sense the pressure of the blended flow at a location downstream from urea outlet 203 and air outlet 306.

The flow of pressurized air to flow passage 330 is controlled by air supply and valve components which are configured to control a supply of air to flow passage 330. One example of a preferred embodiment includes check valve 209 and an upstream air shut off valve. Check valve 209 includes a closing member 210 which extends from a flexible diaphragm 223 in a direction toward seating surface 308. In FIG. 2, closing member 210 is illustrated in a closed position in which it contacts seating surface 308 to form a seal and prevent flow from air supply chamber 222 to flow passage 330. Biasing member 214 applies force to plunger 212 which applies force to closing member 210 to maintain check valve 209 in the closed position. Biasing member 214 is illustrated in the form of a spring but may be a variety of other biasing members operable to provide force to closing member 210 in a direction toward seating surface 308. Valve cover 216 contacts biasing member 214 and holds it in position relative to plunger 212. Valve cover 216 also contacts diaphragm 223 and secures it to the underlying structure of blending device 200. It shall be appreciated that a number of alternate valve and air supply embodiments may also be utilized to control the supply of air to flow passage 330. Such further embodiments may include an air supply control valve, a check valve or various combinations thereof.

The lower surface of diaphragm 223 is exposed to air supply chamber 222 which receives pressurized air from air inlet 220. As used herein, directional terms such as "lower" and "upper" are used to refer to the orientation of the drawings. Such terms are not restrictive of the orientation of the system with respect to the environment. For example, descriptions that reference a vertical direction are equally applicable when the system is in a horizontal orientation or off-axis orientation.

The pressurized air in air supply chamber 222 provides a force against the portions of the lower surface of diaphragm 223 and closing member 210 in contact with air supply chamber 222. This force opposes the force applied to closing member 210 by plunger 212 and biasing member 214. When the force provided by pressurized air in air supply chamber 222 is greater than the force provided by biasing member 214 check valve 209 opens and pressurized air flows from air supply chamber 222 past check valve 209, and into flow passage 330. The opening/closing threshold pressure is established by the pre-loading of biasing member 214. The pre-loading of biasing member 214 is preferably tuned to provide rapid opening of check valve 209 at a pressure at or near a threshold pressure. The threshold pressure is preferably selected to be at or near the normal operating air pressure during urea injection, for example, 90% or more of the normal operating air pressure. This allows check valve 209 to open only when there is sufficient pressure for injection. As further described below, the threshold pressure is selected to be a pressure higher than the urea supply pressure.

The threshold pressure is also preferably selected to provide air flow characteristics effective to inhibit urea crystal growth in flow passage 330 and urea crystal migration toward closing member 210. The inventors have determined that a threshold air flow velocity of at least 47 meters per second (m/s) is effective to inhibit urea crystal growth and migration in flow passage 330. The threshold pressure may be selected to provide a margin of error on the threshold velocity; for example, the pressure may be selected to provide air flow velocity in flow passage 330 of about 50 m/s or between 50 m/s and 60 m/s. It shall be appreciated that the threshold air flow velocity may be provided at one location along or over a portion of flow passage 330.

The magnitude of the air flow velocity effective to inhibit urea crystal growth may vary depending upon the characteristics of flow passage 330, check valve 209 and blending chamber 204. Additional embodiments include air supply passages with different characteristics and have different threshold air pressure values and associated air flow velocities effective to inhibit urea crystal growth. Flow passage 330 is further configured to reduce the velocity of air flow provided to the blending chamber below the threshold air flow velocity. A diffuser section of flow passage 330 may be utilized to provide a desired outlet air flow velocity. The outlet air flow velocity may be selected to avoid damage to blending chamber 204.

Flow passage 330 is further configured to provide a pressure drop along its length such that the air pressure at the inlet of flow passage 330 is greater than the urea injection pressure into the blending chamber 204 and the air pressure at the outlet of flow passage 330 is less than the urea injection pressure into the blending chamber 204. In the illustrated embodiment, flow passage 330 extends over a length of about 6 mm and is configured to provide an outlet pressure of 3.45 bar gauge +/−0.4 bar gauge. This pressure was selected because the nominal urea injection pressure was 4.5 bar gauge and the an air pressure about 1 bar gauge below the nominal urea injection pressure was desired. The desired air pressure in the blending chamber may be used to determine the regulation pressure upstream and the nominal orifice sizing leading to the flow passage 330 to ensure that the air velocity in the air curtain is maintained at or above a threshold velocity.

During normal operation of blending device 200, the pressure at or around the outlet of blending chamber 204 is configured to be less than the air pressure at the outlet of the flow passage 330 and less than the urea injection pressure into the blending chamber 204. Abnormal operating conditions may arise in which the pressure at or downstream of the outlet of blending chamber 204 exceeds the urea injection pressure. This may occur, for example, due to flash boiling of urea injected into a hot exhaust flow path which causes pressure waves to travel toward blending chamber 204. Under such abnormal conditions the pressure drop along flow passage 330 is effective to permit urea injection which would otherwise be inhibited. Additional abnormal operating conditions may arise when a urea injection nozzle becomes blocked either permanently or intermittently. Blockages intermediate the blending chamber 204 and the urea injection nozzle represent further potential abnormal operating conditions.

When abnormal operating conditions are present urea injected into a blending chamber can flow into a portion of flow passage 330 as the pressure at the outlet of flow passage 330 is less than the urea injection pressure, but is prevented from flowing to or past the inlet of flow passage 330 as the pressure at the inlet of flow passage 330 is greater than the urea injection pressure. Once normal operating conditions are restored, the urea solution is expelled from flow passage 330, returns to the blending chamber 204 for injection into the exhaust flowpath. This operation allows system 200 to provide a predetermined amount of urea injection when abnormal operating conditions would otherwise inhibit injection and thus avoids or mitigates disruptions in the supply of the desired amount of urea solution to the exhaust flowpath.

Figure 4:
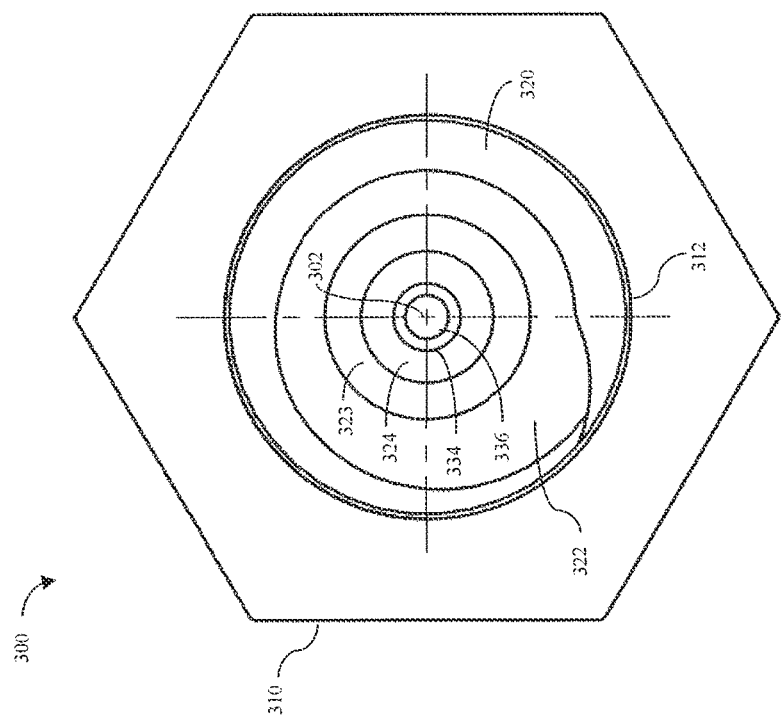
FIG. 4 is a bottom-up elevational view of the illustrative air supply nozzle of FIG. 3.
Figure 3:
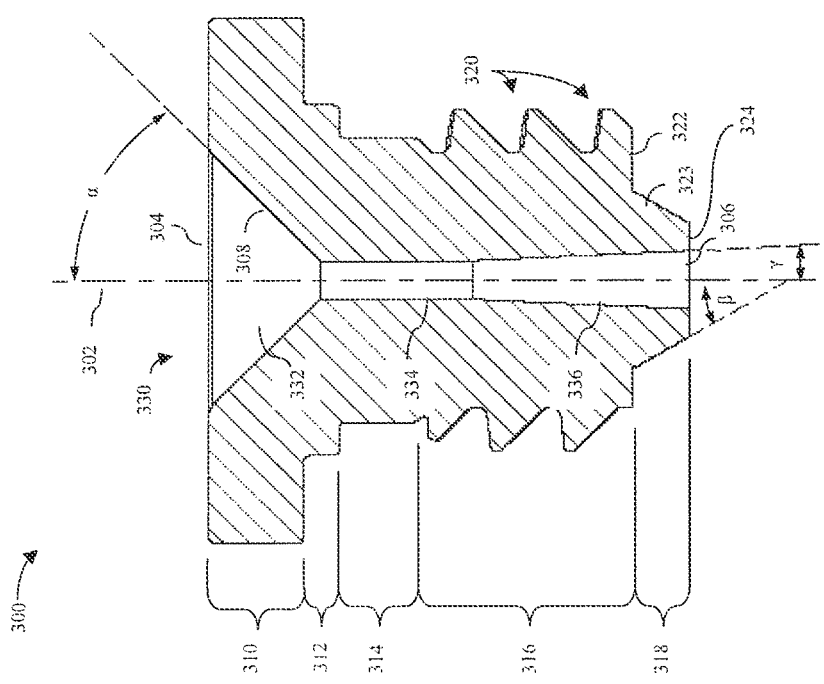
FIG. 3 is a cross-sectional view of an illustrative air supply nozzle.

With reference to FIGS. 3 and 4 in addition to FIG. 2, air illustrative nozzle 300 includes a head 310, a ledge 312, a cylindrical portion 314, a threaded portion 316, a tip 318, and a flow passage 330. Flow passage 330 extends along an axial centerline 302 from an inlet 304 to outlet 306, and includes a seating portion 332, a restriction 334, and diffuser 336. Flow passage 330 is configured to transmit pressurized air from air supply passage 222 to blending chamber 204 through inlet 304, seating portion 332, restriction 334, diffuser 336, and outlet 306.

Head 310 has formed therein seating surface 308, which tapers radially inward from inlet 304 to restriction 334, defining seating portion 332. In the illustrated embodiment, sea ng surface 308 is offset from axial centerline 302 by an offset angle α, defining seating portion 332 as a frustoconical portion. It is also contemplated that other geometries may be employed, depending upon design parameters such as desired flow profile, and properties of stopping member 210. For example, a portion of seating surface 308 may be offset from axial centerline 302 by an angle other than offset angle α, and may be curvilinear. It is also contemplated that seating surface 308 and seating portion 332 may be omitted, an illustrative embodiment of which is described with reference to FIG. 6.

In the illustrated embodiment, head 310 is hexagonal, facilitating torque transmission during installation into the corresponding cavity in blending chamber 200. In other embodiments, head 310 may be defined by another geometric shape. Ledge 312 and cylindrical portion 314 are configured to seal an air supply passage from a cavity in which nozzle 300 is seated. The radius of ledge 312 is slightly greater than the pitch radius of threads 320. In the illustrated embodiment, the diameter of cylindrical portion 314 is less than the major diameter of threaded portion 316, and greater than the pitch diameter of threaded portion 316. It is also contemplated that cylindrical portion 314 may be of another diameter, or may be replaced with a radially-inward tapering nozzle body portion.

Threaded portion 316 defines a plurality of threads 320. As used herein, "plurality of threads" indicates that a cross-section of threaded portion 316 along axial centerline 302 reveals a plurality of ridges, which may of course be formed by a single ridge wrapping around the outer circumference of threaded portion 316. Threads 320 are configured to matingly engage a corresponding set of threads formed in the corresponding cavity. The lower end of threaded portion 316 defines face 322.

Tip 318 includes a tapered surface 323 connecting face 322 to nozzle face 324. Tapered surface 323 tapers radially inward at a tip angle β, and may be closely engaged with a correspondingly-shaped frustoconical portion of a cavity in which nozzle 300 is seated such that the cavity is sealed from the blending chamber. Tip 318 defines outlet 306, through which pressurized air is discharged into blending chamber 204. In the illustrated embodiment, outlet 306 is defined by a second end of diffuser 336. In other embodiments, outlet 306 may be connected to diffuser 336 by way of an intermediate flow passage portion.

Seating portion 332 is configured to receive pressurized air from air supply chamber 222 when check valve 209 is open. Seating portion 332 has an inlet of a first diameter and an outlet of a second diameter less than the first diameter. The second diameter of the outlet is configured to provide pressurized air flow exceeding the threshold velocity. In further embodiments, seating surface 308 and seating portion 332 may be omitted, in which case an orifice leading to restriction 334 may be formed in the upper surface of head 310 and configured with a diameter providing pressurized air flow meeting or exceeding the threshold velocity.

When seating portion 332 is included, restriction 334 is downstream of eating portion 332. In the embodiment of FIG. 3, the outlet of seating portion 332 is the inlet of restriction 334, such that a diameter of restriction 334 is the second diameter. It is also contemplated that restriction 334 may be fluidly coupled to seating portion 332 by way of an intermediate flow passage portion, in which case the diameter of restriction 334 may not be equal to the second diameter. The diameter and axial length of restriction 334 are selected to reduce the pressure and increase the velocity of the pressurized air by a predetermined amount. In the illustrated embodiment, the axial length of restriction 334 is about thirty percent of the total length of nozzle 300. For example, the axial length of nozzle 300 may be about 8 mm, and the axial length of restriction 334 may be about 2.5 mm. In other embodiments, other configurations are contemplated. Furthermore, while restriction 334 is cylindrical, in other embodiments a restriction may be of varying diameters.

Diffuser 336 is located downstream of restriction 334, and is configured to decrease the velocity of the pressurized air. In the illustrated embodiment, the outlet of restriction 334 is the inlet of diffuser 336, such that the inlet diameter of diffuser 336 is the second diameter. It is also contemplated that diffuser 334 may be fluidly coupled to restriction 334 by way of an intermediate flow passage portion, in which case the inlet diameter of restriction diffuser 336 may not be the second diameter.

Diffuser 336 tapers radially outward at a diffuser angle of γ from a diffuser inlet diameter to a diffuser outlet diameter greater than the diffuser inlet diameter. In the embodiment of FIG. 3, the diffuser inlet diameter is the second diameter, the diffuser outlet diameter is a third diameter, and diffuser angle γ is selected such that diffuser 336 extends from restriction 334 to outlet 306. The diffuser outlet diameter is selected such that the velocity of the pressurized air is decreased to an outlet velocity at which wear resulting from high pressure impact with the walls of blending chamber 204 is reduced to a desired velocity which may be selected to mitigate wear or damage on the blending chamber from air provided thereto.

As previously noted, when the velocity of the pressurized air in the flow passage is above a threshold velocity, urea crystal migration in flow passage 330 is inhibited. Restriction 334 and diffuser 336 of flow passage 330 are configured to provide pressurized air having a velocity greater than the threshold velocity when supplied with pressurized air at the threshold pressure, thereby preventing urea crystal migration upstream through restriction 334. Flow passage 330 may alternatively be configured to provide a margin of error on the threshold velocity; for example, flow passage 330 may be configured to provide a velocity of at least about 50 m/s, or between 50 m/s and 60 m/s when supplied with pressurized air at the threshold pressure.

In certain embodiments, the diffuser angle is relatively small—10° or less and the diffuser may extend substantially to the nozzle outlet. For example, in the embodiment of FIG. 3, diffuser angle γ is less than about 5°, and diffuser 336 extends to outlet 306. In other embodiments, diffuser angle γ may be selected from another range, for example less than 10°, or 3° to 15°. In further embodiments, the diffuser angle is relatively large for example, 20° or more—and the diffuser may be connected to the nozzle outlet by way of a connecting passage. Preferably the transitions between different orifice diameters and straight/angled sections of flow passage 330 are configured to maintain a boundary layer connection to the curtain walls and smooth laminar flow throughout. Undesired operation may result if the diffuser angle is too high as the laminar flow in the curtain may separate forming a vortices in the curtain which can significantly increase crystal growth and may ultimately leading to failure.

Restriction 334 and diffuser 336 are configured to provide a pressure drop along their combined length such that the air pressure at the inlet of restriction 334 is greater than the urea injection pressure into a blending chamber in communication with nozzle 300 and the air pressure at the outlet of diffuser 336 is less than the urea injection pressure into the blending chamber. During normal operation, the pressure at or around the outlet of the blending chamber is configured to be less than the air pressure at the outlet of the diffuser 336 and less than the urea injection pressure into the blending chamber. Abnormal operating conditions may arise in which the pressure at or downstream of the outlet of the blending chamber exceeds the urea injection pressure. This may occur, for example, due to flash boiling of urea injected into a hot exhaust flow path which causes pressure waves to travel toward the blending chamber. Under such abnormal conditions the pressure drop along restriction 334 and diffuser 336 is effective to permit urea injection which would otherwise be inhibited. When such abnormal conditions are present urea injected into blending chamber can flow into a portion of diffuser 336 and restriction 334 up to the point which the pressure exceeds the injection pressure. The blending chamber may be configured to allow such urea flow at various distances along diffuser 336 or restriction 334 but to prevent urea from flowing to or past the inlet of flow passage 330 as the pressure at the inlet of flow passage 330 is greater than the urea injection pressure. Once normal operating conditions are restored, the urea solution is expelled from flow passage 330, returns to the blending chamber for injection into the exhaust flowpath. This operation allows a system including nozzle 300 to provide a predetermined amount of urea injection when abnormal operating conditions would otherwise inhibit injection and thus avoids or mitigates disruptions in the supply of the desired amount of urea solution to the exhaust flowpath.

Figure 5:
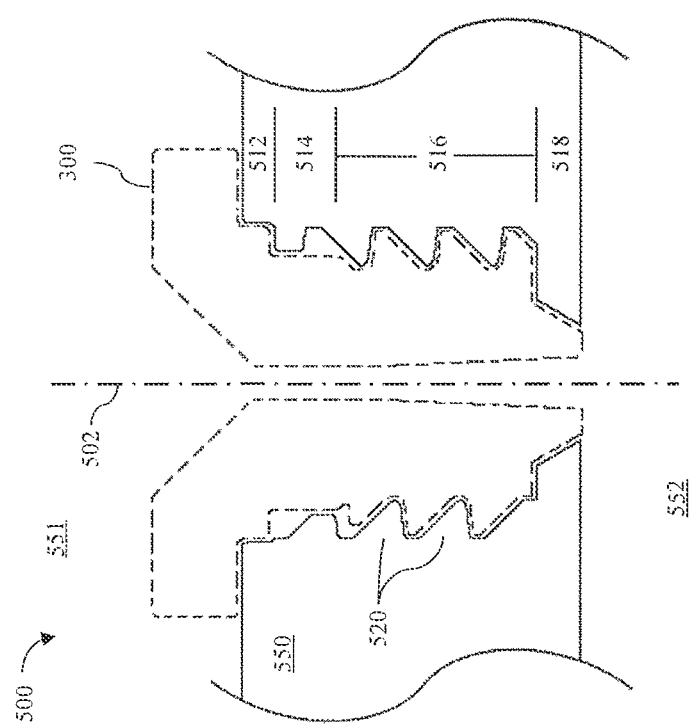
FIG. 5 is a cross-sectional view of an illustrative cavity configured to receive an air supply nozzle.

FIG. 5 depicts an exemplary embodiment of a cavity 500. Cavity 500 is formed in a wall 550—for example a wall of blending device 200—between an air supply chamber 551 and a blending chamber 552. Cavity 500 includes a ledge-accepting portion 512, a cylinder-accepting portion 514, a threaded portion 516, and a tip-accepting portion 518. Cavity 500 is depicted with nozzle 300 installed (illustrated in phantom), such that cavity 500 and nozzle 300 share a common axial centerline 502.

Ledge-accepting portion 512 is configured to closely engage ledge portion 312. Ledge-accepting portion 512 and ledge 312 cooperate to form a seal such that cavity 500 is substantially sealed from air supply chamber 551. The diameter of ledge-accepting portion 512 corresponds to the diameter of ledge 312.

Cylinder-accepting portion 514 is configured to closely engage at least a section of cylinder portion 314. Cylinder-accepting portion 514 has a diameter corresponding to that of cylinder portion 314. Cylinder-accepting portion 514 also defines a plurality of recesses sized to accept nozzle threads 320. The recesses have a maximum radius corresponding to the pitch radius of threads 320.

Threaded portion 516 includes a plurality of cavity threads 520 defined by a plurality of alternating recesses and protrusions. Cavity threads 520 are configured to matingly engage nozzle threads 320, thereby securing nozzle 300 within cavity 500.

Tip-accepting portion 518 is configured to closely engage nozzle tip 318. Tip-accepting portion 518 includes a flat portion configured to closely engage face 322, and a tapered portion configured to closely engage tapered surface 323. Tip-accepting portion 518 also defines cavity outlet 508, which is of a diameter corresponding to that of nozzle face 324. In the illustrated embodiment, tip-accepting portion 518 is configured such that nozzle face 324 is substantially flush with a bottom surface 524 of wall 550. In other embodiments, tip-accepting portion 518 may be of a lesser axial length than nozzle tip 318, such that nozzle tip 318 extends into blending chamber 552. In further embodiments, tip-accepting portion 518 may be of a greater axial length than nozzle tip 318, such that cavity 500 includes a connecting passageway that connects nozzle outlet 306 to blending chamber 552.

Figure 6:
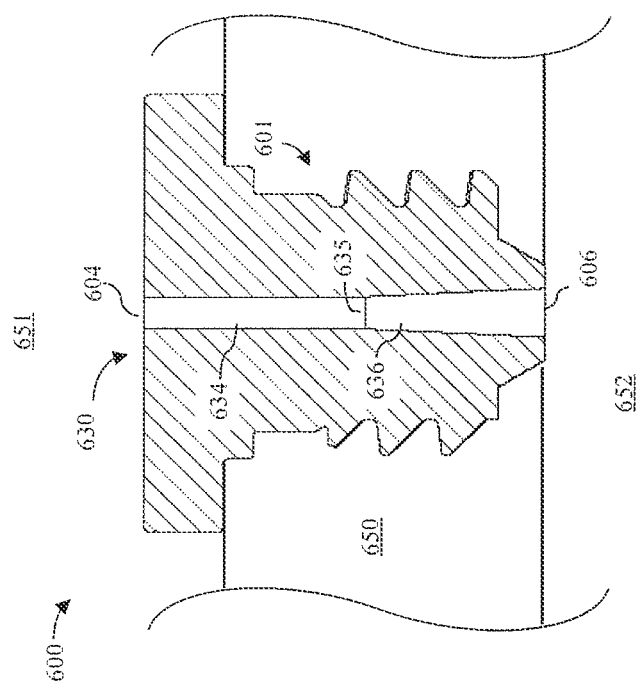
FIG. 6 is a cross-sectional view of an illustrative air supply nozzle installed in a threaded bore.

FIG. 6 illustrates an exemplary nozzle 600 which does not include a seating portion. Nozzle 600 is seated in a cavity 601 which is formed in a wall 650 between an air supply chamber 651 and a blending chamber 652. Nozzle 600 defines a flow passage 630, which includes an inlet 604, a restriction 634, a diffuser 636, and an outlet 604. Restriction 634 is fluidly coupled to air supply passage 602 at inlet 604, and to diffuser 636 at interface 635. Diffuser 636 is fluidly coupled to restriction 634 at interface 635, and to blending chamber 603 at outlet 606.

Figure 7:
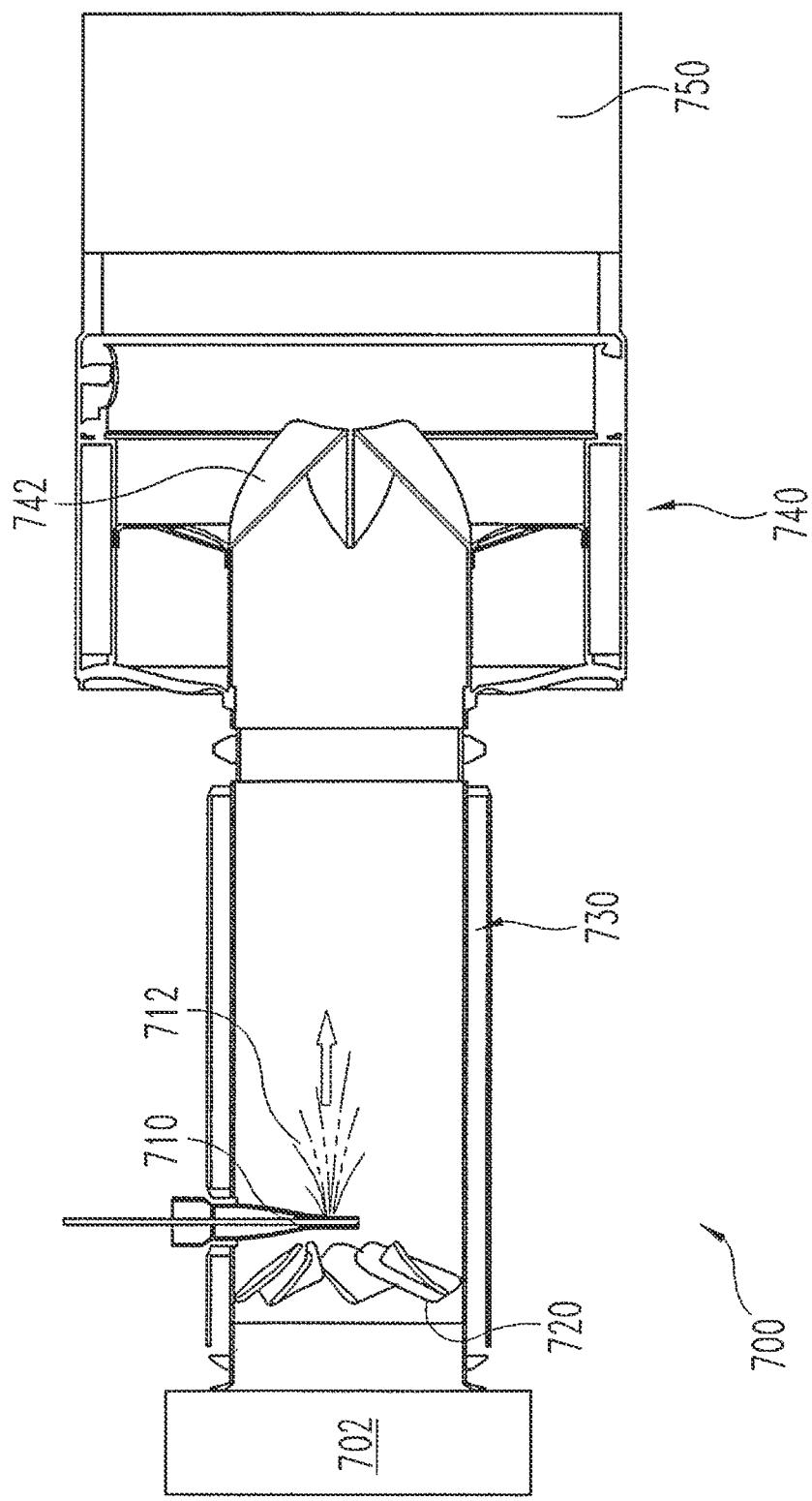
FIG. 7 is a side sectional view of an exemplary exhaust flowpath of an SCR aftertreatment system.

With reference now to FIG. 7, there is illustrated an exemplary exhaust flow path 700 for an SCR aftertreatment system. Exhaust flow path 700 includes an exhaust source 702 which may be a diesel engine for example. Exhaust source 702 provides a flow of exhaust comprising a $NO_x$ constituent through conduit 730. A mixer 720 is disposed in the conduit 730. An injection nozzle 710 is disposed in a location downstream from the mixer 720 at or about the centerline of conduit 730. A blending device, such as blending device 200, supplies a pressurized urea-gas mixture to injection nozzle 710, which injects the mixture in the direction of exhaust flow as indicated by spray 712 and the associated arrow. Spray 712 is distributed generally uniformly in the central region of flow path 730 but not distributed uniformly in the peripheral region of flow path 730.

Mixer 720 imparts a swirl in exhaust flowing through the peripheral region of conduit 730 while allowing flow to continue to proceed normally through the central portion of conduit 730. In this manner exhaust back pressure is minimized by providing minimal instruction to obtain exhaust swirl only in the location where it is needed. The spray of urea solution 712 introduced into conduit 730 decomposes along the length of conduit 730 downstream from injection nozzle 710 to form ammonia. Ammonia is provided from outlet 742 to an SCR catalyst 750 of a catalyst unit 740, which functions to reduce at least a portion of the $NO_x$ constituent in the exhaust.

With reference now to FIGS. 2 and 3 as well as FIG. 7, further aspects of the operation of an exemplary system nozzle 300 and injection nozzle 710 is described. A pressurized urea solution is supplied to blending chamber 204 through metering valve 202 at a nominal urea supply pressure, for example, about 65 psig. Pressurized air is supplied to blending chamber 204 at a nominal pressure of about 50 psig. Urea injection pressure is normally 1-1.5 bar gauge above air pressure. Depending on operation the urea pressure and air pressure may vary from the nominal pressures.

In the illustrated form, the pressurized air enters seating portion 332, which increases the velocity to a first velocity and reduces the pressure to a first pressure while conveying the pressurized air toward restriction 334. The first pressure is preferably also greater than the urea supply pressure. The pressurized air enters restriction 334 at a second velocity and a second pressure. In embodiments which include seating portion 332, the second velocity and the second pressure correspond to the first velocity and the first pressure. In embodiments in which seating portion 332 is not included, the second velocity and the second pressure correspond to the inlet velocity and the inlet pressure. In either case, the second pressure is less than the chamber pressure, and the velocity of the compressed air in restriction 334 and diffuser 336 of flow passage 330 is greater than a threshold velocity sufficient to inhibit urea crystal growth and migration. By way of non-limiting example, the threshold velocity may be 47 m/s, about 50 m/s, or between 50 m/s and 60 m/s.

Restriction 334 further reduces the pressure of the pressurized air. The pressurized air exits restriction 334 and enters diffuser 336 at a third velocity and a third pressure. The third pressure may be greater than or less than the urea supply pressure, and the third velocity may be greater than or equal to the threshold velocity. Diffuser 336 expands and slows the pressurized air, and discharges the pressurized air into blending chamber 204 through outlet 306. At outlet 306, the pressurized air has a fourth velocity and a fourth pressure. The fourth velocity is lower than the threshold velocity, and is sufficiently low to reduce wear which would otherwise result from high pressure impact with the walls of blending chamber 204. The fourth pressure is less than the urea supply pressure, and may be, for example, about 20 psig. The fourth pressure is less than the inlet pressure by at least a minimum pressure loss, and is preferably less than the first pressure by at least the minimum pressure loss. The minimum pressure loss is at least 15 psi, and is preferably 20 psi or 30 psi.

During normal operation of the system, the pressurized urea and the pressurized air enter blending chamber 204, and the urea becomes entrained in the pressurized air. This urea-air mixture is conveyed to injection nozzle 710 via a mixture supply line. Due to the high temperature exhaust flowing through conduit 730, injection nozzle 710 can become very hot. When injection nozzle 710 is at a high enough temperature, the urea-gas mixture may undergo flash-boiling upon contacting injection nozzle 710. This flash-boiling sends a pressure wave back through the mixture supply line and toward blending chamber 204.

When the pressure wave increases the pressure at the outlet of the blending chamber 204 above the urea injection pressure, the pressurized urea can no longer exit via outlet member 230, and instead flows into air flow passage 330. Because the pressure at the inlet of air flow passage 330 is greater than the urea injection pressure, the pressurized urea is prevented from traveling beyond the inlet where urea crystal formation can be problematic. At the same time injection is not inhibited because the pressure at the outlet of air flow passage 330 is less than the urea injection pressure.

Once the pressure wave has dissipated, the pressurized urea exits flow passage 330, and the system returns to functioning as before. The high velocity of the pressurized air within flow passage 330 creates a shear force sufficient to remove any urea droplets or crystals which may be present on the walls of the flow passage. This mitigates the reliability and warranty issues associated with crystallization and loss of air flow due to flash boil crystallization at hot exhaust conditions. As noted above, during operation of the system it is also possible that a urea injection nozzle may become blocked either permanently or intermittently. In the event of such blockage, the pressure at the inlet of air flow passage 330, which is greater than the urea injection pressure, prevents the injected urea from traveling beyond the inlet where urea crystal formation can be problematic. When the blockage is removed, injection may proceed according to normal operation.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
    supplying pressurized urea solution to a mixing chamber at a urea supply pressure;
    supplying compressed gas to a gas supply passage at a gas supply pressure;
    conveying the compressed gas through the gas supply passage, wherein conveying the compressed gas through the gas supply passage comprises flowing the compressed gas through a diffuser configured to decrease pressure of the gas from a passage inlet pressure to a passage outlet pressure and decrease velocity of the gas from a passage inlet velocity to a passage outlet velocity, the diffuser having a varying inner cross sectional area along a longitudinal axis of the gas supply passage;
    providing the compressed gas from the diffuser of the gas supply passage to the mixing chamber such that the compressed gas mixes with the urea solution to provide a urea-gas mixture; and
    providing the urea-gas mixture from the mixing chamber to an exhaust flowpath;
    wherein the urea supply pressure is greater than the passage outlet pressure and less than the passage inlet pressure.

2. The method of claim 1, wherein the passage outlet velocity is at least 47 meters per second and the passage inlet velocity is greater than the passage outlet velocity.

3. The method of claim 1, further comprising:
    conveying the urea-gas mixture from an outlet of the mixing chamber to an injector fluidly coupled to an exhaust passage having an exhaust stream comprising a $NO_x$ constituent flowing therethrough; and
    injecting a portion of the urea-gas mixture into the exhaust passage through the injector.

4. The method of claim 3, further comprising:
    increasing pressure at the outlet of the mixing chamber above a urea injection pressure;
    providing pressurized urea solution from the mixing chamber to the diffuser of the gas supply passage;
    decreasing pressure at the outlet of the mixing chamber below the urea injection pressure; and
    providing pressurized urea solution from the diffuser of the gas supply passage to the mixing chamber.

5. The method of claim 4, wherein the increasing pressure at the outlet of the mixing chamber above the urea injection pressure is due to one of a flash-boiling of urea at the injector or a blockage of a urea injection nozzle.

6. The method of claim 1, wherein the urea supply pressure is 1-2 bar gauge greater than the passage outlet pressure.

7. The method of claim 1, wherein the passage outlet pressure is less than a chamber pressure of the mixing chamber by at least 30 psi.

8. The method of claim 1, wherein conveying the compressed gas through the gas supply further comprises directing the compressed gas to a seating portion of the gas supply passage, the seating portion being inwardly tapered and having an inlet of a first diameter.

9. The method of claim 8, wherein conveying the compressed gas through the gas supply passage further comprises flowing the compressed gas from the seating portion into a gas flow restriction portion adjacent to and downstream of the inwardly tapered seating portion and upstream the diffuser, the gas flow restriction portion having a second diameter and an axial length, wherein the first diameter, the second diameter, and the axial length are configured to cause an increase in a velocity of the pressurized gas passing through the gas flow restriction portion to a value above a threshold velocity at which urea crystal migration upstream through the gas flow restriction portion is inhibited.

* * * * *